United States Patent [19]
Jefferies et al.

[11] Patent Number: 6,071,204
[45] Date of Patent: Jun. 6, 2000

[54] SPROCKET WITH REPLACEABLE WEAR-ABSORBING INSERTS

[75] Inventors: Robert Andre Jefferies, Lumby; Gary Garth Seabrook, Delta, both of Canada

[73] Assignee: Sealtek Fabrications Ltd., British Columbia, Canada

[21] Appl. No.: 09/113,433

[22] Filed: Jul. 10, 1998

[51] Int. Cl.⁷ .................................................. F16H 55/06
[52] U.S. Cl. .............................................................. 474/161
[58] Field of Search ..................................... 474/161, 901, 474/152; 305/194, 103, 197; 29/893

[56] References Cited

U.S. PATENT DOCUMENTS

| | | | |
|---|---|---|---|
| 1,870,801 | 8/1932 | Engstrom et al. | 474/161 X |
| 2,179,967 | 4/1939 | Thompson | 29/893 X |
| 3,504,562 | 4/1970 | Hirych | 464/161 |
| 4,472,164 | 9/1984 | Pusch et al. | 474/161 |
| 5,829,850 | 11/1998 | Ketting et al. | 305/194 |

FOREIGN PATENT DOCUMENTS 219960  9/1988  Japan ..................................... 474/161

*Primary Examiner*—David A. Bucci
*Assistant Examiner*—Marcus Charles
*Attorney, Agent, or Firm*—Trask Britt

[57] ABSTRACT

A sprocket having a plurality of circumferentially spaced teeth with an insert seat formed between each pair of teeth. A wear-absorbing insert is removably mounted in each of the insert seats, for example, by press fitting the insert into the insert seat. An insert retainer is fastenable adjacent each insert and insert seat to prevent removal of the inserts from the insert seats as the sprocket is drivingly rotated to propel a chain entrained over the sprocket teeth. Each insert retainer can be unfastened to permit removal of the inserts from the insert seats as the inserts become worn. Each pair of sprocket teeth includes a leading tooth edge and a trailing tooth edge. The insert seat is formed over a portion of the leading tooth edge and over a portion of the trailing tooth edge. The insert has an inward edge shaped for snug mating engagement in any one of the insert seats, and an outward edge defining a leading tooth profile and a trailing tooth profile. The leading tooth profile smoothly merges with the leading tooth edge and the trailing tooth profile smoothly merges with the trailing tooth edge when the insert is mounted in the insert seat as aforesaid. The insert retainer includes at least one fastening member which can be fastened through the sprocket adjacent the insert seat to position first and second retaining portions on opposite sides of the sprocket and insert to prevent movement of the insert with respect to the insert seat. The fastening member can be unfastened to remove the retaining portions and permit removal of the insert from the insert seat.

9 Claims, 5 Drawing Sheets

SPROCKET WITH REPLACEABLE WEAR-ABSORBING INSERTS

TECHNICAL FIELD

This application pertains to a sprocket having an insert seat formed between each pair of teeth. A wear-absorbing insert is removably mounted and retained in each insert seat. Worn inserts are easily replaced, without demounting or replacing the entire sprocket.

BACKGROUND

Sprockets are commonly used to drive chains in a wide range of industrial applications. As depicted in FIG. 5, a conventional prior art sprocket 13 has a plurality of circumferentially spaced teeth. Sprocket 13 is fixed, via flange 9 and hub 10, on drive shaft 14 which is drivingly rotated as indicated by arrow 16 to rotate sprocket 13. A chain comprising conventionally interlinked barrel portions 5 and link portions 15 is entrained over sprocket 13 and propelled forwardly or backwardly, depending upon the direction of rotation of drive shaft 14.

Some prior art sprockets consist of a single unitary piece which can be welded to a hub. Other prior art sprockets are cast to form the sprocket, flange and hub as a single assembly. Still other prior art "split" sprockets consist of two halves which can be bolted onto a hub flange. Sprockets are typically made of steel, cast iron or plastic.

Significant friction forces are produced as the sprocket propels the chain. These forces wear the sprocket at its points of contact with the chain. Specifically, the driven side of the sprocket groove between each pair of sprocket teeth eventually shows signs of wear due to engagement of the chain barrel portions within the sprocket groove. The sprocket is preferably replaced when such wear becomes apparent.

If a worn sprocket is not replaced reasonably promptly then the worn sprocket regions increase in size. The worn regions initially appear as indentations in the driven side of the sprocket groove. The indentations elongate as wearing progresses, increasing the gap between the teeth at the bottom of the sprocket groove. When the chain direction is reversed, the chain barrel portions must travel an increased lateral distance along the widened gap, producing chain slack which causes the sprocket to hammer against the chain (i.e. backlash). The degree of sprocket (and chain) wear is compounded over time. If neglected, both sprocket and chain can be seriously damaged, resulting in potential equipment breakdown.

Sprocket replacement can be time-consuming, labour-intensive and expensive. For example, if the sprocket is welded onto a hub assembly (as is common), the entire assembly must be removed and replaced. This can be particularly time-consuming and expensive if the sprocket-hub assembly is mounted in a location which is not easily accessible, such as within a conveyor belt drive assembly.

Worn split sprockets are more easily replaced, since they are bolted to the hub flange and do not typically require removal or replacement of the entire sprocket and hub assembly. However, split sprockets are not suitable in many applications, because the bolts which couple the sprocket halves to the hub can be loosened or sheared by sudden jarring, vibration or other substantial forces typically encountered in normal sprocket operation. Moreover, split sprockets do not address the aforementioned wearing problem.

It is sometimes possible to reposition the sprocket in a manner which can reduce wearing somewhat. For example, in some bulldozers, the sprockets are elevated considerably with respect to their conventional positions between the bulldozer tracks. This reduces the degree of articulation of the tracks around the sprockets, which in turn reduces the required area of contact between the tracks and sprockets, thus reducing wear on both parts. However, this technique necessarily lengthens the tracks, and does not eliminate but merely defers somewhat the eventual need for replacement of worn sprockets.

Another commonly employed technique for reducing wear of both chain and sprocket involves installation of the chain itself. Specifically, if the chain is installed with the wide part of each link forward in the direction of chain travel, then chain and sprocket wear is reduced somewhat in comparison to the situation in which the chain is installed with the narrow part of each link forward. However, wear still occurs, and worn sprockets must eventually be replaced.

The present addresses the sprocket wear problem.

SUMMARY OF INVENTION

In accordance with the preferred embodiment, the invention provides a sprocket having a plurality of circumferentially spaced teeth with an insert seat formed between each pair of teeth. A wear-absorbing insert is removably mounted in each of the insert seats, for example, by press fitting the insert into the insert seat. An insert retainer is fastenable adjacent each insert and insert seat to prevent removal of the inserts from the insert seats as the sprocket is drivingly rotated to propel a chain entrained over the sprocket teeth. Each insert retainer can be unfastened to permit removal of the inserts from the insert seats as the inserts become worn.

Each pair of sprocket teeth includes a leading tooth edge and a trailing tooth edge. The insert seat is formed over a portion of the leading tooth edge and over a portion of the trailing tooth edge. The insert has an inward edge shaped for snug mating engagement in any one of the insert seats, and an outward edge defining a leading tooth profile and a trailing tooth profile. The leading tooth profile smoothly merges with the leading tooth edge and the trailing tooth profile smoothly merges with the trailing tooth edge when the insert is mounted in the insert seat as aforesaid.

Advantageously, the insert retainer includes at least one fastening member which can be fastened through the sprocket adjacent the insert seat to position first and second retaining portions on opposite sides of the sprocket and insert to prevent movement of the insert with respect to the insert seat. The fastening member can be unfastened to remove the retaining portions and permit removal of the insert from the insert seat.

DESCRIPTION

Figure 1:
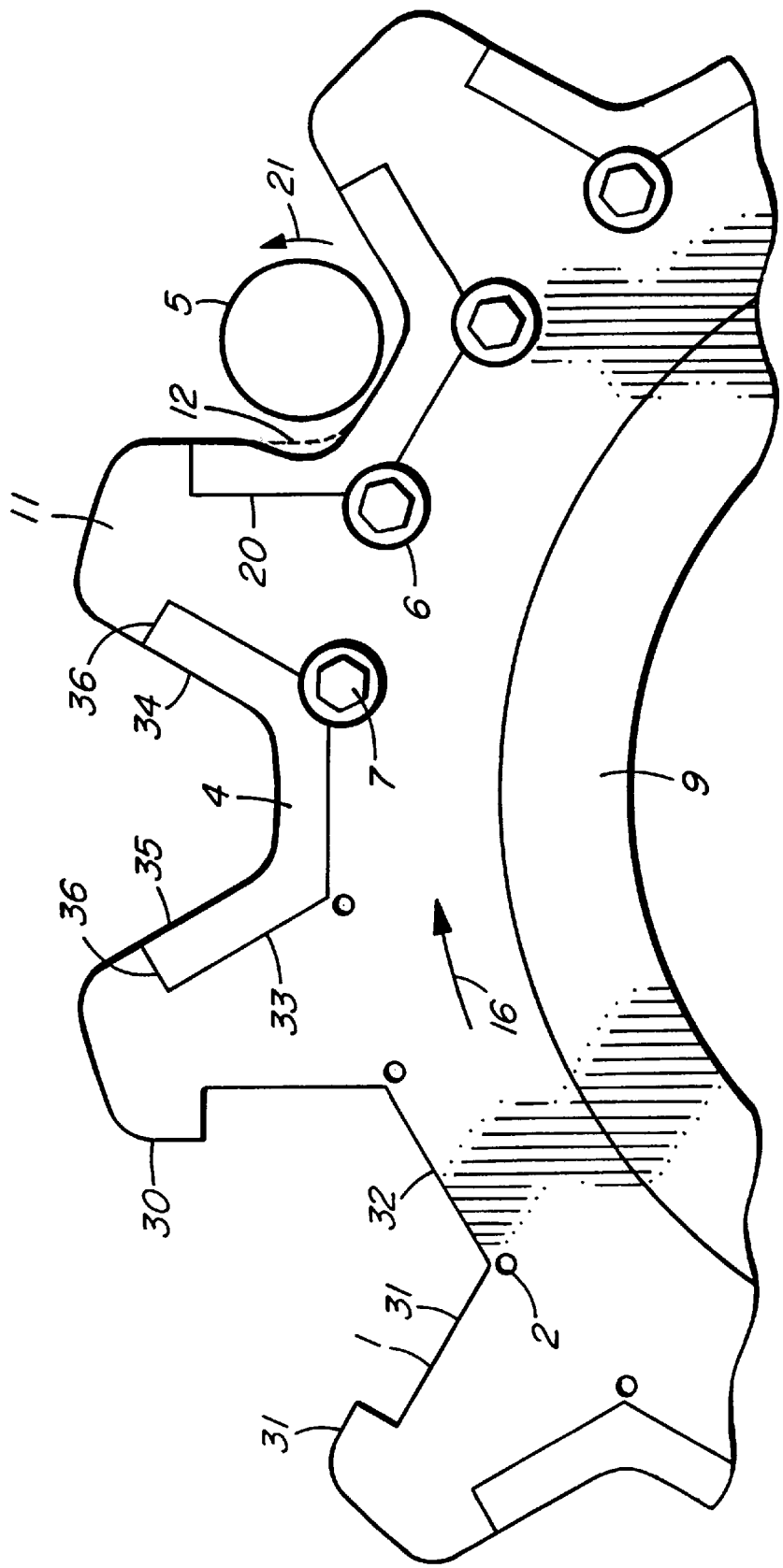
FIG. 1 is a side elevation view of a portion of a sprocket adapted in accordance with the invention and showing (i) an insert seat formed between the leftmost pair of sprocket teeth, (ii) a new insert removably mounted and partially retained between the central pair of sprocket teeth, and (iii) a worn insert removably mounted and retained between the right most pair of sprocket teeth.

FIG. 1 depicts a sprocket 11 adapted in accordance with the invention by forming an insert seat 1 between each adjacent pair of circumferentially spaced sprocket teeth. A wear-absorbing insert 4 is removably mounted in each insert seat 1, as hereinafter explained. For each insert and insert seat pair, at least one insert retainer is provided to prevent removal of inserts 4 from insert seats 1 during normal driven operation of sprocket 11. The insert retainers can be unfastened as hereinafter explained to permit removal and replacement of worn inserts. For example, insert 20 mounted between the rightmost pair of sprocket teeth depicted in FIG. 1 is worn as indicated at 12, due to friction forces imposed on the driven side of the leftward sprocket tooth by chain barrel portion 5 as it rotates in the direction indicated by arrow 21.

Each pair of sprocket teeth comprises a leading tooth edge 30 and a trailing tooth edge 31. As seen in FIG. 1, insert seat 1 is formed to extend over a portion (preferably, a substantial portion) of leading tooth edge 30, over a portion (preferably, a substantial portion) of trailing tooth edge 31 and over the groove area 32 between tooth edges 30, 31. Inserts 4 are formed with inward edges 33 shaped for snug, mating engagement within any one of insert seats 1. Each insert 4 also has an outward edge which defines a leading tooth profile 34 and a trailing tooth profile 35. The upper ends of tooth edges 30, 31 are stepped inwardly, as indicated at 36, to provide abutment surfaces for the upper ends of inserts 4, thereby preventing radial outward movement of inserts 4 with respect to insert seats 1.

When an insert 4 is properly mounted in an insert seat 1, leading tooth profile 34 smoothly merges with leading tooth edge 30 and trailing tooth profile 35 smoothly merges with trailing tooth edge 31. Accordingly, when inserts are properly mounted in all of the insert seats on a sprocket, the merged tooth edges and tooth profiles together form continuous tooth surfaces shaped and sized like the teeth of a conventional prior art sprocket 13 which has not been adapted in accordance with the invention.

Figure 2:
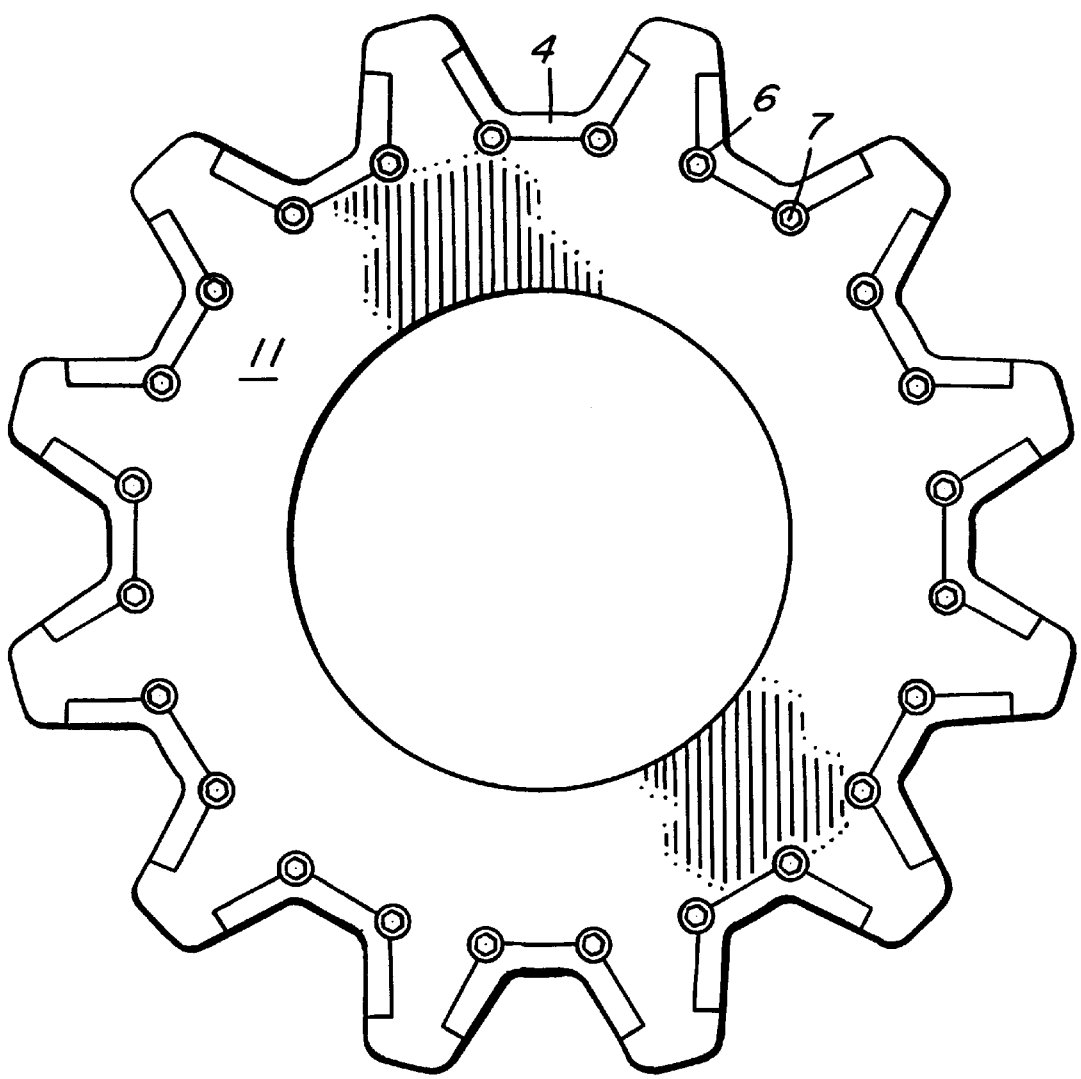
FIG. 2 is a side elevation view of a sprocket adapted in accordance with the invention, showing inserts removably mounted and retained between each pair of sprocket teeth.
Figure 4:
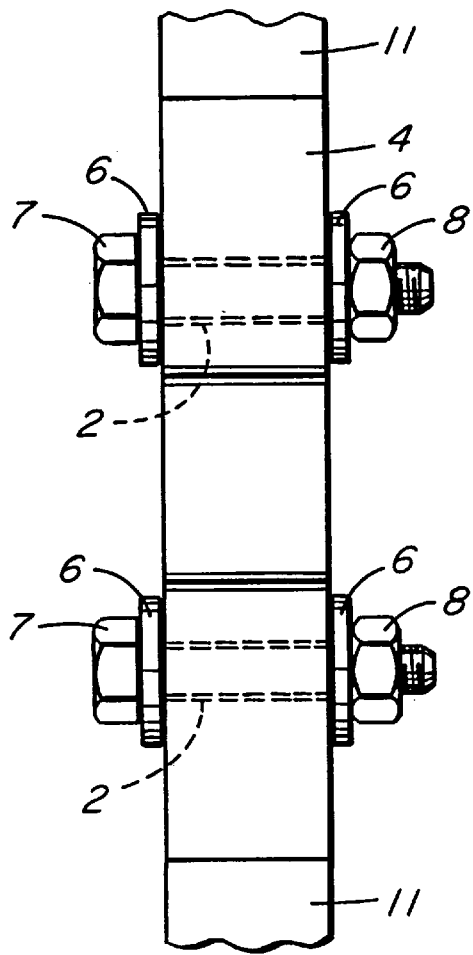
FIG. 4 is an end elevation view of a portion of a sprocket adapted in accordance with the invention, showing the insert retainer.
Figure 6:
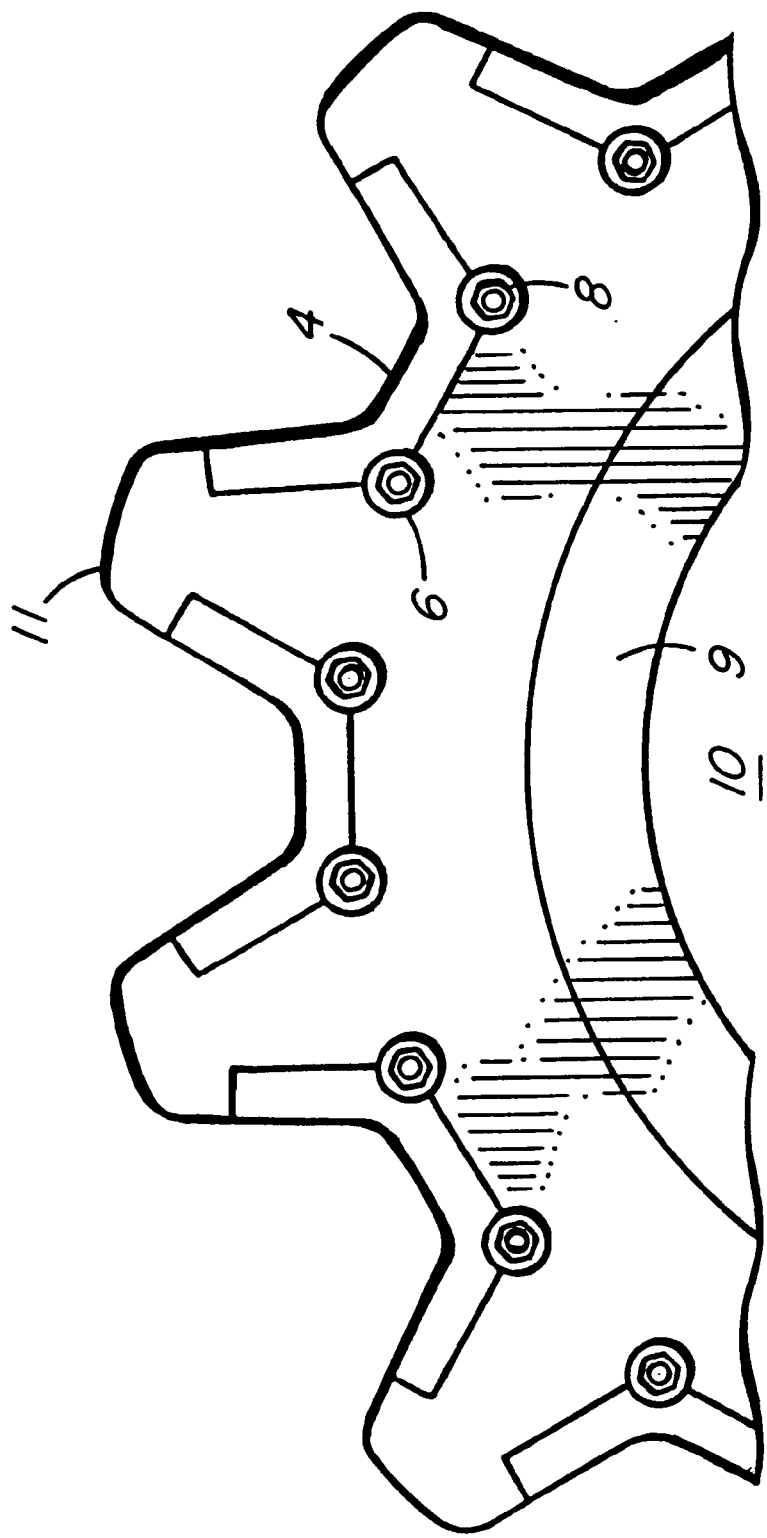
FIG. 6 is a side elevation view of a portion of the FIG. 2 sprocket, showing the opposite side thereof.

As best seen in FIGS. 1, 4 and 6, the insert retainer mechanism preferably takes the form of a bolt 7 which is passed through one of two apertures 2 provided in sprocket 11 beneath the lower corners of insert seat 1. Retaining portions such as washers 6 are positioned over bolt 7 on opposite sides of sprocket 11. Washers 6 are sufficiently large that they overlap and bracket a portion of insert 4. Nut 8 is threadably fastened over the protruding end of bolt 7 to hold washers 6 in place. As seen in FIG. 2, similar bolt, nut and washer arrangements are provided in both of the two apertures 2 provided in sprocket 11 adjacent each of inserts 4. Washers 6 securely clamp inserts 4 from both sides of sprocket 11, preventing the inserts from moving in their respective insert seats during normal driven operation of sprocket 11. If an insert exhibits wear, as indicated at 12 in FIG. 1 then the worn insert 20 can be prepared for removal from its insert seat by removing nuts 8, bolts 7 and washers 6 so that the worn insert 20 is no longer clamped as aforesaid.

Figure 3:
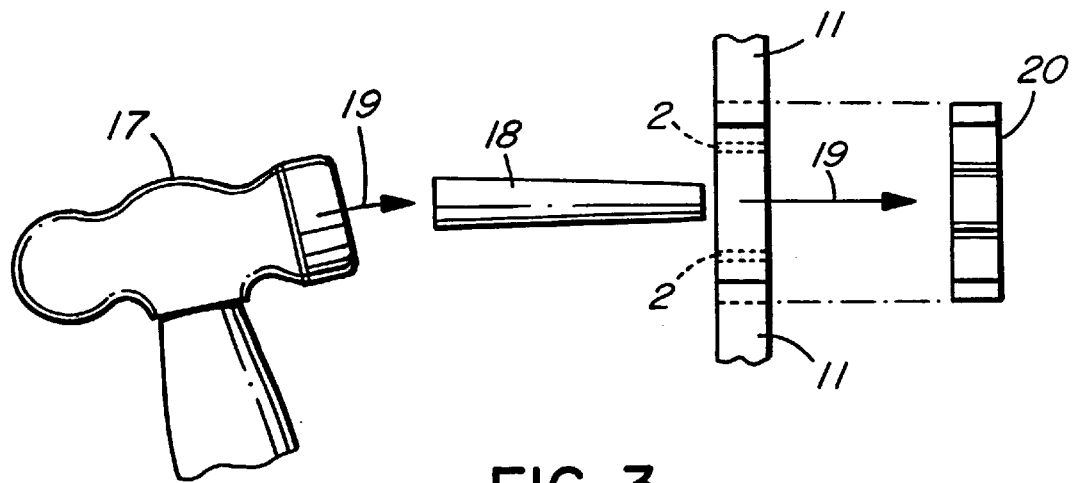
FIG. 3 is a schematic end elevation view of a portion of a sprocket adapted in accordance with the invention, showing removal of a worn insert therefrom.

Worn inserts are removed (and new inserts installed) in the manner schematically illustrated in FIG. 3. Specifically, a drift 18 is held against the worn insert 20. Drift 18 is then struck with hammer 17 to apply force as indicated by arrows 19 in order to dislodge the worn insert 20 from its insert seat. A new insert 4 can then be pressed-fitted into the insert seat by aligning the new insert over the insert, positioning drift 18 against the aligned insert and then tapping drift 18 with hammer 17 until the insert is fully seated.

Persons skilled in the art will appreciate that the invention facilitates replacement of worn inserts 20 without the need to demount or replace sprocket 11 and without the need to remove any chain entrained over sprocket 11. Specifically, sprocket 11 can be rotated to position worn insert 20 away from contact with the entrained chain. Worn insert 20 can then be removed as aforesaid, replaced by a new insert 4, and sprocket 11 again rotated to position any additional worn insert(s) for removal and replacement.

Sprockets embodying the invention can be readily substituted for currently employed prior art sprockets. In the case of prior art single piece sprockets or solid cast sprockets, the FIG. 5 assembly consisting of sprocket 13, shaft 14, flange 9 and hub 10 is removed. Prior art sprocket 13 is then removed from flange 9 by cutting or hammering. A new sprocket 11 incorporating inserts 4 is then welded to flange 9 and the entire assembly is then replaced for entrainment with chain 15. If prior art sprocket 13 is a split sprocket, the FIG. 5 assembly is left in place, the bolts fastening the split sprocket to flange 9 of hub 10 are removed, and the split sprocket halves are then removed. If the new sprocket 11 incorporating inserts 4 is in the form of a single piece sprocket or a solid cast sprocket, then the new sprocket is welded to flange 9 of hub 10. If the new sprocket 11 incorporating inserts 4 is in the form of a split sprocket, then the new sprocket 11 is bolted onto flange 9 of hub 10.

Figure 5:
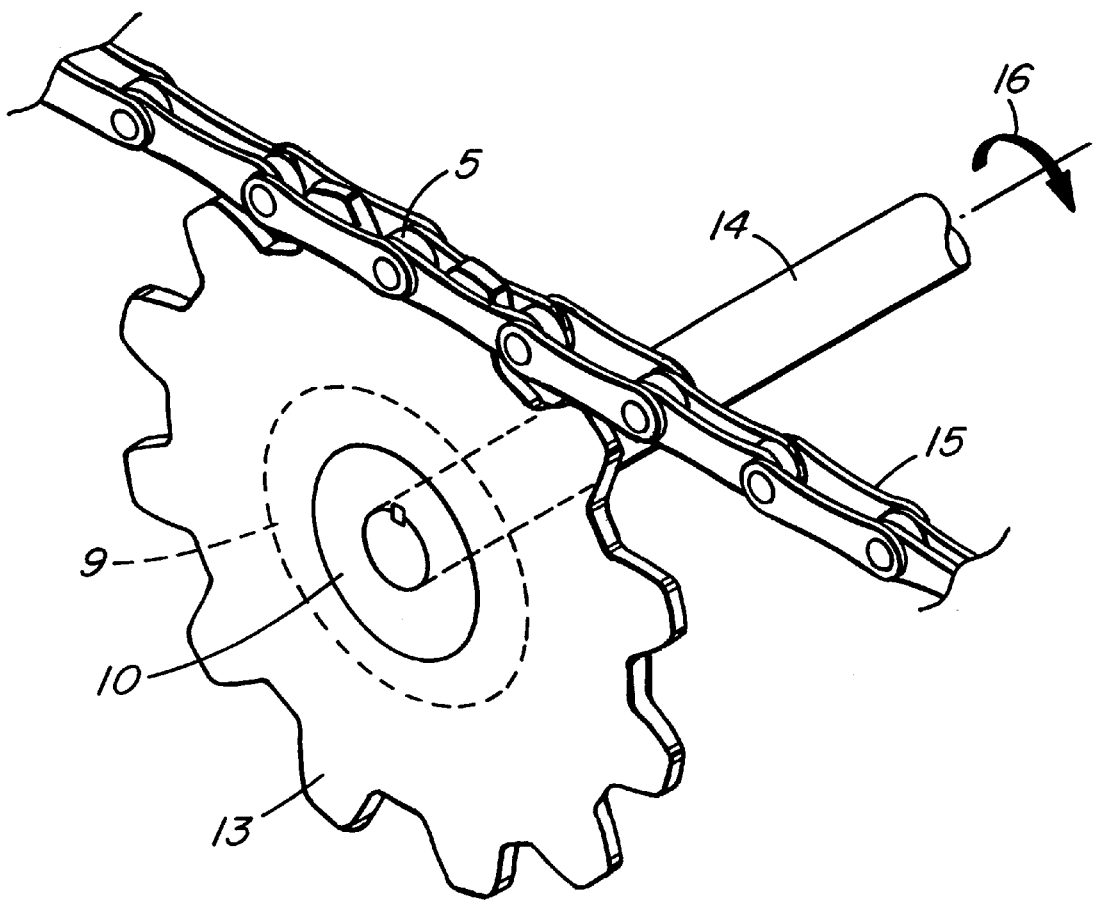
FIG. 5 is a perspective illustration of a prior art sprocket drivingly rotated by an axle to propel a chain entrained over the sprocket teeth.

Once new sprocket 11 is installed as aforesaid, future maintenance of sprocket 11 does not require removal of any portion of the FIG. 5 assembly. Only worn inserts need be replaced. As previously explained, replacement of worn inserts does not require demounting or replacement of sprocket 11, nor is it necessary to remove any chain entrained over sprocket 11.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A sprocket, comprising:
   (a) a plurality of circumferentially spaced teeth;
   (b) an insert seat formed between each pair of said teeth;
   (c) an insert removably mountable in each of said insert seats; and,
   (d) for each one of said inserts and insert seats, an insert retainer fastenable to said sprocket to prevent removal of said inserts from said insert seats and unfastenable to permit removal of said inserts from said insert seats said insert retainer further comprising at least one fastening member fastenable through said sprocket adjacent said insert seat to position first and second retaining portions on opposite sides of said sprocket and said insert to prevent movement of said insert with respect to said insert seat, said fastening member unfastenable to remove said retaining portions and permit movement of said insert with respect to said insert seat.

2. A sprocket as defined in claim 1, wherein:
(a) said pair of said teeth further comprise a leading tooth edge and a trailing tooth edge; and,
(b) said insert seat is formed over a portion of said leading tooth edge and over a portion of said trailing tooth edge.

3. A sprocket as defined in claim 2, wherein said insert is press-fitted into said insert seat.

4. A sprocket as defined in claim 2, wherein:
(a) said insert has:
(i) an inward edge shaped for snug mating engagement in any one of said insert seats; and,
(ii) an outward edge defining a leading tooth profile and a trailing tooth profile;
whereby said leading tooth profile smoothly merges with said leading tooth edge and said trailing tooth profile smoothly merges with said trailing tooth edge when said insert is mounted in said insert seat.

5. A sprocket as defined in claim 2, wherein said insert seat is formed over a substantial portion of said leading tooth edge and over a substantial portion of said trailing tooth edge.

6. A method of managing sprocket tooth wear in a sprocket having a plurality of circumferentially spaced teeth, said method comprising the steps of:
(e) forming an insert seat between each pair of said teeth;
(f) removably mounting a wear-absorbing insert in each of said insert seats;
(g) restraining said inserts during driving operation of said sprocket by bracketing said inserts from opposite sides of said sprocket to prevent movement of said inserts with respect to said insert seats, thereby preventing removal of said inserts from said insert seats; and,
(h) upon wearing of any of said inserts beyond a predefined wear threshold, removing and replacing said worn inserts.

7. A method as defined in claim 6, wherein said pair of said teeth further comprise a leading tooth edge and a trailing tooth edge, said forming step further comprising forming said insert seat over a portion of said leading tooth edge and over a portion of said trailing tooth edge.

8. A method as defined in claim 6, wherein said removably mounting said insert further comprises press-fitting said insert into said insert seat.

9. A method as defined in claim 6, further comprising:
(a) before said removably mounting said insert, forming said insert with:
(i) an inward edge shaped for snug mating engagement in any one of said insert seats; and,
(ii) an outward edge defining a leading tooth profile and a trailing tooth profile;
(b) during said removably mounting said insert, smoothly merging said leading tooth profile with said leading tooth edge and smoothly merging said trailing tooth profile with said trailing tooth edge.

\* \* \* \* \*